United States Patent [19]

La Manna et al.

[11] 3,890,645

[45] June 17, 1975

[54] MAGNETIC TRANSDUCER

[75] Inventors: Richard J. La Manna, Whippany; Alan K. Jensen, Livingston, both of N.J.

[73] Assignee: Litton Business Systems, Inc., Pine Brook, N.J.

[22] Filed: Feb. 12, 1971

[21] Appl. No.: 128,602

Related U.S. Application Data

[63] Continuation of Ser. No. 856,856, Sept. 10, 1969, abandoned, which is a continuation of Ser. No. 487,866, Sept. 16, 1965, abandoned.

[52] U.S. Cl. .............................................. 360/117

[51] Int. Cl. .............................................. G11b 5/12

[58] Field of Search ............. 179/100.2 C, 100.2 T; 35/35 C; 360/117

[56] References Cited

UNITED STATES PATENTS

| | | | |
|---|---|---|---|
| 2,352,023 | 6/1944 | Schüller | 179/100.2 T |
| 2,548,011 | 4/1951 | Frost | 179/100.2 C |
| 2,977,423 | 3/1961 | Springer | 179/100.2 T |
| 3,077,587 | 2/1963 | Springer | 179/100.2 T |

*Primary Examiner*—Raymond F. Cardillo, Jr.
*Attorney, Agent, or Firm*—Norman Friedman

[57] ABSTRACT

A handheld magnetic transducer comprises a magnetic core structure having a reading portion or keeper. The keeper has a curved surface. The gap of the reading means is in the form of a helix in order to provide greater flexibility in reading a magnetic record.

7 Claims, 14 Drawing Figures

MAGNETIC TRANSDUCER

This application is a continuation of a U.S. Pat. Application Ser. No. 856,856 filed Sept. 10, 1969 and now abandoned; said application Ser. No. 856,856 being a continuation of U.S. Pat. Application Ser. No. 487,866 filed Sept. 16, 1965 and now also abandoned.

This invention relates generally to electromagnetic transducers and more particularly to a manually positioned transducer for recording onto or reading from a magnetic record, said transducer having a unique gap arrangement whereby transducing errors due to the position of the transducer with respect to a magnetic record are reduced.

In the recording onto or reading from a magnetic record, such as a magnetic tape, card, or the like with electromagnetic transducers of the prior art, it is necessary to maintain correct spacing and positioning of the transducer with respect the record. As is well known in the art, electromagnetic transducers are generally constructed of one or more pole pieces made of iron, ferrite, or the like and fashioned into a generally ring-shaped body. The pole pieces are either cut or formed such that two abutting faces thereof are parallel and closely spaced but do not touch. This resulting space, termed the gap, is required for both the reading and recording functions. The gap may be filled with air or some other material having a lower permeability than the surrounding pole pieces. As a result, flux passing from the pole pieces to the gap material is caused to fringe and strike the magnetic record placed closely adjacent the transducer. In this manner recording is permitted to take place. In a similar manner, the gap is used to sense the flux surrounding a magnetic area of a magnetic record and permit its introduction into the pole pieces which conduct the flux to a pickup coil for conversion to a read current.

The amount of read current available will be dependent upon the original strength of the magnetized area of the magnetic record, the materials of the pole pieces and gap, and the shape, position, and spacing of the gap with respect to the record media. Increasing the spacing between the gap and the magnetized area will reduce the flux reaching the transducer thus reducing the read current. Further, any angular change in the position of the gap with respect to the record media from the required perpendicular position will effectively increase the gap to media spacing and decrease the received flux. Skewing of the position of the gap from its normal position, perpendicular to the direction of record media movement, may introduce spurious signals from adjacent recorded areas thus decreasing the available flux.

In order to minimize positioning errors of the type described above and increase the effective flux employed to produce the reading current, the path of movement of the record is carefully controlled and the transducer is rigidly mounted to maintain desired spacing and alignment with the magnetic record media. Such rigid mounting is also necessary for the transducer during recording because alignment errors reduce the flux reaching the media and thus reduce the recording strength and enlarge the recording area. With this requirement for rigid mounting it is not possible to record and read magnetic records with a transducer which is manually positioned by an operator with respect to a record.

It is therefore an object of this invention to provide a manually positioned transducer for recording onto and reading from a magnetic record.

It is another object of this invention to provide a manually positioned transducer for recording onto and reading from a magnetic record, said transducer having a unique gap arrangement whereby flux losses during recording or reading as a result of transducer positioning are reduced.

It is still another object of this invention to provide a transducer having a unique gap arrangement whereby flux losses during recording or reading as a result of the position of said transducer during the relative motion of said transducer and a media is reduced.

It is yet another object of this invention to provide a manually positioned transducer for recording onto and reading from a magnetic record, said transducer having a unique gap arrangement whereby flux losses during recording or reading are reduced over a wide range of angular positions of said transducer with respect to said magnetic record.

It is another object of this invention to provide a manually positioned transducer which can be carried by the hand of an operator.

It is yet another object of this invention to provide a manually positioned transducer which can be worn on a finger or thumb of an operator's hand.

It is yet another object of this invention to provide a manually positioned transducer having a unique gap formed by intersecting a portion of the ring-shaped pole pieces by a smooth continuous curve, said curve extending about the complete surface of a portion of said pole pieces.

It is a further object of this invention to provide a magnetic transducer having a first portion thereof containing a gap curved to minimize the spacing between the gap and the record media regardless of the angular position of said transducer with respect to said media.

Other objects and features of the invention will be pointed out in the following description and claims and illustrated in the accompanying drawing, which disclose, by way of example, the principles of the invention, and the best modes which have been contemplated for carrying them out.

In the drawings:

FIG. 1 is a highly simplified perspective view of a magnetic transducer as is widely employed in the field.

FIG. 2 comprising FIGS. 2*a* and 2*b*, illustrates inside elevations the flux linkages which exist between a magnetized area of a magnetic record and the transducer of FIG. 1, when said transducer is in correct alignment with said area and when the alignment is incorrect, respectively.

FIG. 3 is a perspective view illustrating a magnetic transducer constructed in accordance with the concepts of this invention.

FIG. 4 is a side elevation of the transducer of FIG. 3 shown with a magnetic recording media.

FIG. 5 is a front elevation of the transducer of FIG. 3.

FIG. 6 is a top view of the transducer of FIG. 3 placed with respect to a record and illustrating the orientation of the individual magnetized areas thereon.

FIG. 7 illustrates a preferred embodiment of the transducer of FIG. 3, showing the manner in which it is worn by the operator and moved with respect to a magnetic record media.

FIG. 8 shows a further embodiment of the transducer of the invention suitable for wearing on an operator's finger.

FIG. 9 shows the transducer of FIG. 8 when worn on an operator's thumb.

FIG. 10 illustrates a further embodiment of the transducer of this invention arranged to be held by the hand of an operator.

FIG. 11 illustrates a further embodiment of the transducer of this invention wherein the transducer is mounted at one end of a handle, the handle being grasped by the hand of an operator for movement.

FIG. 12 illustrates an alternative arrangement of the transducer of FIG. 11 wherein the transducer itself is extended to become the handle.

FIG. 13 illustrates a further arrangement of the transducer of FIG. 3 wherein the transducer is affixed to a counter or the like and the record media is passed over the transducer and in contact therewith.

FIG. 14 illustrates an alternate arrangement of the transducer of FIG. 3 wherein the transducer is affixed to a counter or the like and the record media is passed over the transducer but spaced apart therefrom.

Similar elements will be given similar reference characters in each of the respective figures.

Broadly stated, the invention provides a transducer for reading from or recording onto a magnetic record media moved with respect thereto. The transducer can be moved with respect to the record or the record moved with respect to the transducer. The transducer is so designed that the reading means thereof and the record have relative motion in a number of directions the reading means, when adjacent to the surface of the record and during relative movement therebetween, is responsive to the lines of flux during relative rotation between the reading means and the record about an axis, that axis being substantially perpendicular to the lines of flux and parallel to the surface of the record; or the reading means is responsive during the relative movement between the record and the reading means in a skewed path relative to an intended reading path defined on the magnetic record; or the reading means is responsive during relative rotation between the reading means and the record about an axis which is perpendicular to the record surface (this last mentioned rotation being to an acute angle with respect to an axis which is substantially parallel to the record surface and perpendicular to the lines of flux). The reading means is responsive during any combination of such rotations and movement.

The transducer of this disclosure is formed in a generally ring-shaped with one sector of the ring flattened such that the transducer appears much like a flat tire. The flattened area, however, is arranged to have a curvature transverse to the flattened sector. A gap is cut into the flattened area starting at one point on one side of the surface and tracing along the surface to a point on the side opposite from the starting point and at the other end of the surface. For example a diagonal may be traced across the flattened area from one contact area with the nonflattened ring surface to the other and extend along the entire 360° of surface revolution. Any other smooth, continuous curve or line may be used to trace a gap across this flat area. As a result of this unique gap arrangement and the curvature of the flattened area, a portion of the gap may be brought into close contact with a magnetized area of a magnetic record media and thus reduce flux losses found in conventional transducers when improperly placed with respect to a record media.

Turning now to FIG. 1, there is shown an illustration of a typical magnetic transducer as used in the prior art. Such transducer 20, generally takes the shape of a ring or may be somewhat flattened out in the manner as shown. The transducer 20 may be constructed of a solid magnetic material such as soft iron, nickel, cobalt, steel, ferrite, or similar material. The gap 22 may be provided when the material is formed into its particular shape or may be milled from the material itself after formation. In the back portion of the transducer 20 is placed a coil 24 which may be used alternatively for supplying writing current to the transducer 20 or for receiving or providing reading current therefrom, depending upon the mode of operation. Alternatively, two coils 24 may be provided, one for reading and one for writing purposes. It can be seen from the FIG. 1, that the gap 22 is arranged perpendicular to the faces 26 of the magnetic transducer 20.

FIG. 2*a* shows the manner of employment of the magnetic transducer 20 with respect to a magnetic record media 28. The transducer 20 is aligned with the record media 28 in such a manner that the faces 26 of the magnetic transducer 20 are parallel with the direction of movement of the record media 28, and the gap 22 is placed perpendicular to the surface of the record media 28. The gap 22 is shown placed is in such a position to cause the reading of the magnetized area 30 of the recording media 28. A plurality of flux lines 32 are shown emanating from the left-hand portion of the magnetized area 30, extending about the magnetized area, above and below it, and closing to the right-hand portion of the magnetized area 30. One of these lines of flux 34 is shown entering the magnetic structure of the magnetic transducer 20 at the gap 22. This line of flux 34 continues through the entire structure and exit from the opposite face of the gap 22 and then re-enter the magnetized area in order to form a closed loop. From this highly simplified representation it is quite obvious that only a portion of the available flux from the magnetized area 30 is available for entry into the transducer 20. Some of the flux is permitted to travel through the body of the magnetic record media 28 and close upon itself, while others close through the air between the magnetized media 28 and the magnetic transducer 20. The reason for the entry into the magnetic structure is that the permeability of the material used as the body of the magnetic transducer 20 is far greater than the permeability of the material between the faces of the gap 22. As a result it is easier for the flux to close upon itself by passing through the path including the body of the magnetic transducer 20 then it is to breach the entire length of the gap 22. The strength of the flux, which is permitted to enter and which as a result produces readout current in the coil 24, is dependent upon the original strength of the magnetized area 30, the spacing between the record media 28, the magnetic transducer 20, the width of the gap 22 along the direction of travel of the magnetic media 28, the length of the gap perpendicular to the direction of travel of the media 28, and the composition of the body of the magnetic transducer 20.

FIG. 2*b* shows the same record media 28 and the same transducer 20. The transducer 20 is placed in a tilted position such that the gap 22 is no longer perpendicular to direction of travel of the media 28. Instead, the gap 22 is set at some acute angle to the media 28. As a result, the flux exiting from some magnetized area 30 is caused to travel a greater distance through the air in order to enter one of the faces of the gap 22 in the transducer 20. This will cause a great reduction in the amount of flux which is permitted to enter the body of the transducer 20. The remaining flux is able to close through the shorter air passage to the opposite side of the magnetized area 30. This is due to the lower total reluctance of the air path as compared to a long air-pole piece path. This bypassing of the transducer 20 causes a great reduction in the amount of flux available through the body of the transducer 20 and thus decreases the amount of signal available at the winding 24.

In order to minimize the possibility of such inclination of the gap of a magnetic transducer with respect to the magnetic surface of the magnetized record to be read or recorded upon it is a general practice in the prior art to rigidly mount the transducers and to control the path of movement of the magnetic media so as to assure proper alignment and proper positioning of the gap with respect to the magnetic media. It should be understood that in the ideal condition, shown in FIG. 2*a*, write current supplied to the winding 24 is permitted to enter the magnetic media 28 and produce a greater strength recording then is possible in the arrangement of FIG. 2*b*. In FIG. 2*b* a greater area is caused to be recorded in and as a result there is a decrease in signal strength at any given area.

Turning now to FIG. 3, a magnetic transducer constructed in accordance with the concepts of this invention is shown. The transducer 40 has a generally ring-shaped body portion 42 and a flattened gap bearing portion or reading means 44. As may better be seen from FIG. 4, the bottom surface of the flattened portion or keeper means 44 is maintained with a substantially cylindrically curved surface 46 despite the flattening of the portion 44. THe gap 48, shown in greater detail in FIG. 5, is formed around the flattened portion 44 by tracing a diagonal line from one side 50 of the flattened area 44 to the other side 52 of the flattened portion 44. In that the diagonal is traced about the curved surface 46 (shown in FIG. 4), the gap 48 will appear to spiral about the flattened portion 44. Although the path of the gap 48 is shown to take on a generally spiral or helical appearance, due to the wrapping of the diagonal around the surface 46 of the flattened area 44, the gap may take any other convenient form such that it extends around a majority of the surface of the flattened portion 44. A coil 54 is wrapped about a portion of the ring body portion 42 to supply write current or to receive reading current depending upon the use made of the magnetic transducer 40.

Turning again to FIG. 4, the use and arrangement of the transducer 40 with respect to a magnetic area 60 of a magnetic record 62 is described. The transducer 40, illustrated in solid lines, is shown in a position perpendicular to the surface of the magnetic record 62 and presents a portion of its gap 48 to the flux about the magnetized area 60. In the dotted line illustration a further position of the transducer 40 is shown. It can be seen that although the transducer 40 is inclined some angle with respect to the perpendicular position (shown by the solid lines), a portion of the gap 48 is nonetheless exposed to and closely positioned with respect to magnetic area 60 of the magnetic record 62. The curved surface 46 permits the transducer 40 to move the gap 48 to close proximity with the record 62 regardless of the angle at which the transducer 40 is placed with respect to that record 62. This an angle almost zero to 180°, plus or minus 90°, with respect to the perpendicular position shown by the transducer 40 in solid lines. The curvature of the gap 48 about the surfaces 46 of the flattened portion 44 of the transducer 40 permits a portion of the gap 48 to be brought in close proximity to the magnetized area 60 regardless of the position of the transducer 40. Thus, despite the transducer position, the transducer 40 may function without loss of efficiency.

The transducer body 42 itself may be fabricated from one or more portions of ferrite material, steel, or any other material showing a relative high permeability. The gap may be filled with air or a conductive material, such as copper or some other conductive material, having a relatively low permeability to prevent the concentration of flux within the gap 48 and to permit the greatest amount of flux to pass within the transducer 40.

Turning now to FIG. 6, there is shown one manner of recording of information upon the magnetic record 62 which increases the packing density of information for use with the magnetic transducer 40. In this arrangement, a transducer 40 is shown positioned above the record 62 having recorded thereon magnetizable areas 60. Stippled portions are employed to indicate a magnetic polarity of a first type whereas clear areas indicate a magnetic polarity of the opposite type. The angular arrangement of the boundaries of the individual magnetized areas is arranged to be equal to the diagonal pitch of the gap 48 of the transducer 40. Although it is normally intended that the transducer 40 be moved in a direction parallel with the longest dimension of a magnetic record, such movement is not entirely necessary and rotation of the transducer 40 about its central axis such as to bring the gap 48 at some acute angle with the boundaries of individual magnetizable areas is possible without disturbing the ability of the magnetic transducer 40 to function. Although the gap 48 is quite extensive it should be understood that only a portion of the gap 48 is in contact with the surface. The portion of the gap 48 in contact depends upon the angle at which the transducer 40 is held with respect to the perpendicular to the surface of the magnetic record 62. Thus, only a portion of the gap 48 is actually adjacent the record 62 and only a small portion of an individual magnetized area 60 is read. Due to the small acceptance angle of the gap of the transducer 40, it is not necessary that the transducer 40 be perfectly centered with respect to the record width for maximum performance.

Turning now to FIG. 7, there is shown a preferred embodiment by which a transducer 70 may be worn by an operator while reading a magnetic record 70. In such an arrangement, the record 72 remains relatively stationary and the operator causes the transducer 70 to be passed back and forth over individual magnetized areas of the record 72. Attached to the magnetic transducer 70, which is of extremely small size, is a ring portion 74 adapted to be worn about the finger or thumb of the operator. A coil 76, wrapped about the transducer 70, is employed to receive or transmit appropriate read or write currents.

In FIG. 8, a size of the transducer 80 is increased such that the transducer 80 may itself be worn on a finger of an operator's hand. FIG. 9, shows the transducer 80 worn about the thumb of the operator. In FIG. 10, the size of a transducer 90 is greatly increased such that the entire transducer 90 may be grasped by hand and moved over a magnetic record.

FIG. 11 shows a further arrangement wherein a small transducer 70, of the type shown in FIG. 7, may be mounted in or on a handle 95 of some nonmagnetic material, such as wood or plastic which would not affect the transducer 70. The connecting lines to a coil 76 would then be passed down through the handle 95 to the transducer 70. In an alternative arrangement, the entire transducer 98 may be elongated, as shown in FIG. 12, such that the transducer 98 itself may be grasped a.

In FIG. 13, a further arrangement is shown whereby a transducer 100 may be mounted within the cavity in a table or other means 102. Items 104 bearing a magnetic record on a surface are passed over the transducer 100. Operated in such a manner motion items 104, which may be packages, are moved with respect to a stationary transducer 100. The unique gap arrangement permits the proper reading of the magnetic record whether or not the record surface is moved in a plane parallel with the transducer 100.

FIG. 14 shows a further arrangement wherein a similar transducer 100 may be mounted in a cavity of a table or other support 102, and an item 106, which may be irregular in shape, are held in the hand of an operator, are passed over but not in contact with the transducer 100. Again, the unique gap arrangement of the transducer 100 virtually eliminates the need for the item 106 to be moved in a plane parallel with the transducer 100. While there have been shown and described various arrangements by which a manually positioned transducer or manually moved record with respect to a fixed transducer may be constructed and operated it is obvious that those skilled in the art may make other arrangements of the elements disclosed here without the departing from the scope thereof.

What is claimed is:

1. A transducer device for manually scanning a magnetic record, said device comprising:

a magnetic core structure having a generally U-shaped portion, the ends thereof being connected by a generally straight portion, said straight portion being arcuately contoured in a direction generally transverse to the length thereof and being provided with a gap extending generally at an oblique angle to said length;

electrical coil means wound upon said magnetic core structure to provide for the transduction of a magnetically induced signal; and means for manually moving said device with respect to said magnetic record.

2. A manually positionable transducer device for scanning a magnetic record, said device comprising:

A magnetic core structure generally U-shaped, the end portions thereof being connected together by a gap-bearing portion, said gap-bearing portion being substantially cylindrical in shape and arcuately contoured in a direction generally transverse to the direction of the contained gap, said core structure being unrestrained relative to said magnetic record so as to be manually moveable about an axis substantially perpendicular to the direction of said scanning and parallel to said magnetic record, said movement covering a portion of an arc substantially coincident with the contour of said gap-bearing surface;

electrical coil means wound upon said magnetic core structure to provide for the transduction of a magnetically induced signal; and means for manually moving said device with respect to said magnetic record and in a length direction thereof.

3. A transducer device as defined in claim 2 wherein the gap in said gap-bearing portion extends along the length of a portion thereof.

4. A transducer as defined in claim 2 and wherein said gap-bearing portion the gap extends in a spiral-like manner substantially along the bottom surface thereof and in the direction of said first axis.

5. A transducer device as defined in claim 4 and further comprising holding means disposed so that said transducer may be held in the hand of a user.

6. A transducer device as defined in claim 5 wherein said holding means includes said core structure, said core structure generally having a ring-shaped body portion and including said cylindrical gap-bearing portion.

7. A transducer device as defined in claim 5 wherein said holding means comprises a digit strap adjusted to receive a finger of the hand of an operator.

* * * * *

UNITED STATES PATENT OFFICE
CERTIFICATE OF CORRECTION

PATENT NO. : 3,890,645

DATED : June 17, 1975

INVENTOR(S) : R. J. LaManna et al

It is certified that error appears in the above-identified patent and that said Letters Patent are hereby corrected as shown below:

Column 6, line 5, eliminate "an" and insert after angle --may vary from--

Column 6, line 18, insert after gap --48--

Column 6, line 58, "70" should be --72--

Column 7, line 17, eliminate "a"

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*